Oct. 31, 1933.  R. B. JOSE  1,932,698
COMPRESSED AIR DRIVEN VEHICLE
Filed April 20, 1932   3 Sheets-Sheet 2
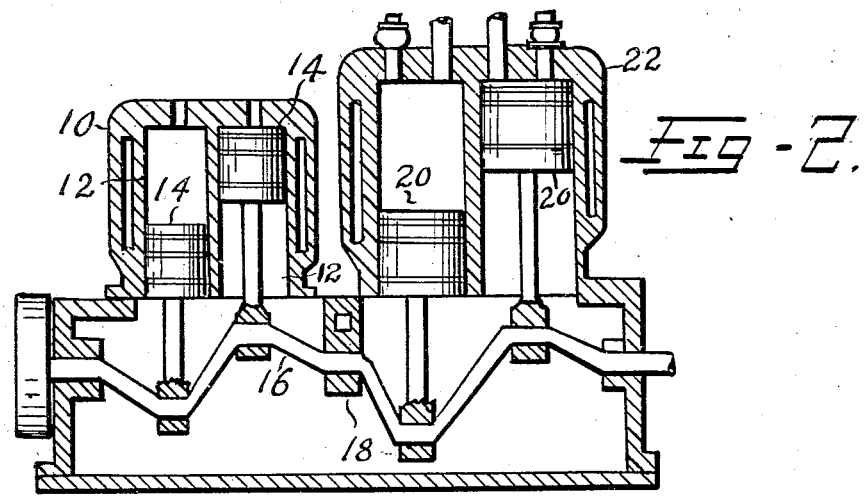
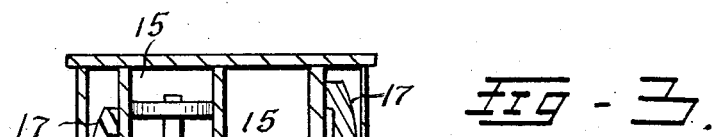
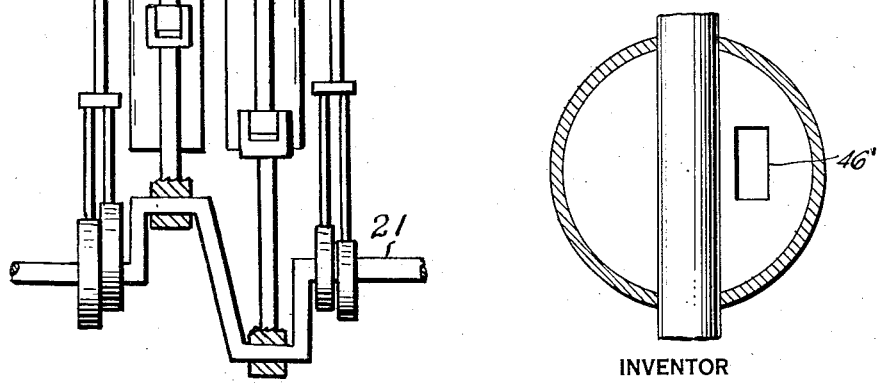
INVENTOR
*Robert B. Jose.*
BY
*Robert P. Martin.*
ATTORNEY

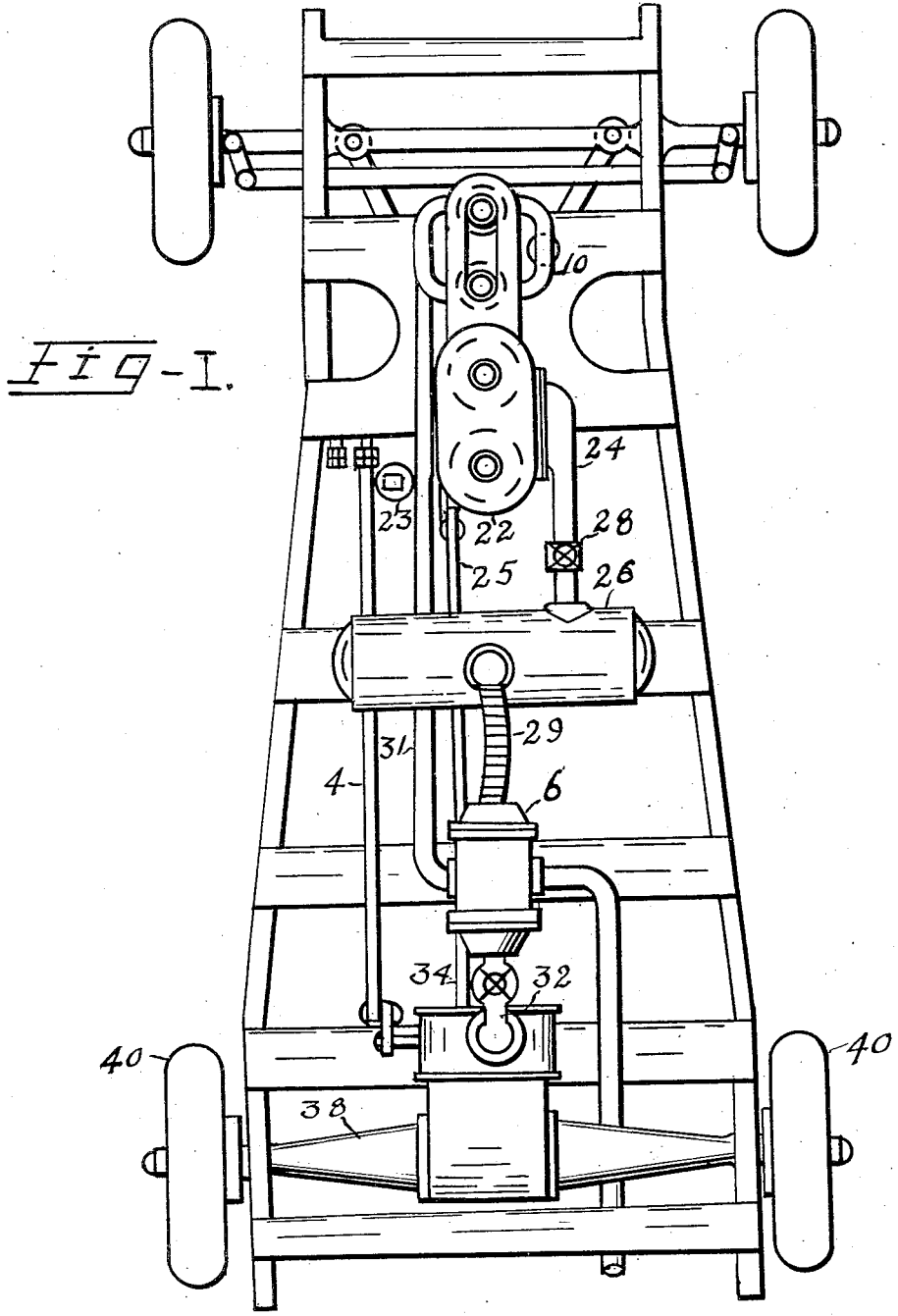

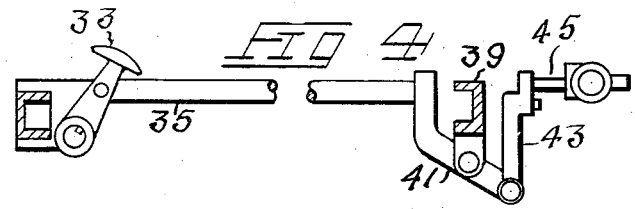
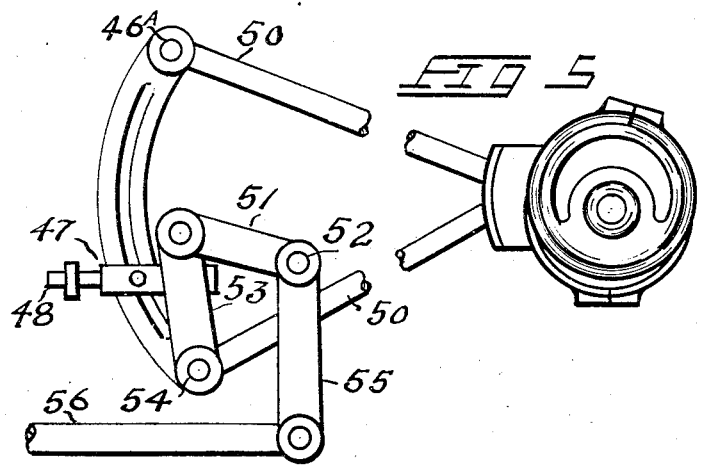
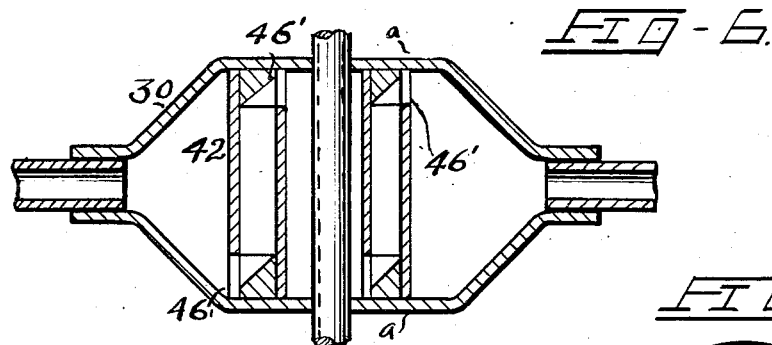
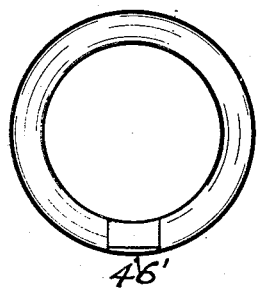
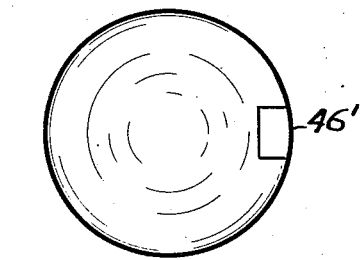

Patented Oct. 31, 1933

1,932,698

UNITED STATES PATENT OFFICE 1,932,698

COMPRESSED-AIR DRIVEN VEHICLE

Robert B. Jose, Everett, Wash.

Application April 20, 1932. Serial No. 606,391

1 Claim. (Cl. 180—66)

My invention relates to improvements in motor-driven vehicles, and more particularly to that class actuated by compressed air.

One of the objects of my invention is the provision of an apparatus of simple and practicable construction for generating compressed-air in a suitable compressor actuated by an internal combustion engine and utilizing the air under pressure in a suitable reversible air-motor suitably arranged to apply its power nearly directly to the rear driven wheels of the car.

A further object of my invention is to provide a storage tank for compressed air transversely on the chassis of the car.

Another object of my invention is to provide a thermal device to pass the air through before it goes into the air motor; said device being provided with two or more disks with suitable space between said disks to allow a sufficient amount of air to pass therethrough, each disk being provided with an elongated hole, said holes being staggered, one on the one side and the next on the other side. This means is to give the air travel in the thermal device a greater travel, so it may absorb more heat.

A further object is to pass the exhaust pipe through the thermal device transversely.

A still further object of my device is to provide flexible means between the air-tank and the thermal device, said means being longitudinally located on the center line of the car.

With the above and other objects in view, as will be hereinafter apparent, the invention consists in general of certain novel details of construction and combination of parts, hereinafter fully described, illustrated in the accompanying drawings and specifically claimed.

In the accompanying drawings, like characters of reference indicate like parts in the several views, and;

Fig. 1 is a plan view and assembly of parts;

Fig. 2 is a vertical section of the combustion motor and air compressor;

Fig. 3 is a vertical section of the air motor;

Fig. 4 is a detached view in side elevation of the controlling device for the air motor throttle valve;

Fig. 5 is a fragmental view in side elevation upon an enlarged scale of the reversing mechanism for the air-motor;

Fig. 6 is a plan view in section of my thermal heating device, showing the disks inside and the exhaust pipe passing through transversely;

Fig. 7 is a sectional view of line $a$—$a$ in Fig. 6;

Fig. 8 is a side view of one of the rings which separates the disks with sufficient space for air to travel through;

Fig. 9 is an end view of Fig. 8; and

Fig. 10 is an elevation of one of the disks showing the elongated hole or slot therein.

Referring to the drawings in which like reference characters indicate like parts, numeral 10 designates a two cylinder engine housing, combustion chamber 12—12, and having two pistons 14—14 coupled to a crank shaft 16, which runs through a bearing 18 and is coupled to two air compressor pistons in air compressor 22, the latter having an air line 24 which leads to the air tank 26 (Fig. 1), air line 24 having a check valve 28. 29 is a flexible air coupling leading from the air tank 26 to the thermal device, which has an exhaust pipe leading from the combustion engine and passing through the thermal device transversely. At the aft end of the thermal device is another air coupling 32; provided with another check valve, the coupling 32 leading to the air motor on the rear end of the car.

Turning to Fig. 3 of the drawings, 17—17 indicates the slide valves, 15—15 indicates the cylinders, and 21 is the crank shaft which drives wheels 40. It will be understood that any suitable air motor may be employed, such as in use on a steam-driven car. 38 is the rear axle of the car which drives the two rear wheels. 25 is the air motor control.

Turning to Fig. 4 of the drawings, 33 is a foot lever in convenient position for operation by the foot of the driver; a rod 35 is connected at one end to said foot-lever and is connected at its other end to an arm of a bell-crank lever 41, pivoted upon one of the transverse frame numbers 39; a link 43 is connected to the other arm of the lever 41 adapted to turn or oscillate valve spindle 45 to close or open the valve to the desired extent and to thus supply the actuating air to the air-motor in the desired quantities, the throttle valve being fixedly secured at the end of spindle 45.

Turning to Fig. 5, an apparatus is shown including a link 46—A, a block 47 slidable therein with which a rod 48 is rigidly connected and which controls the slide-valve in the usual manner. 50—50 are the rock-shafts; 51 is a lever which is fixedly secured to 55; at one end of 55 is connected a lever 56, and at its other end a lever 53. This link motion apparatus is the reversing mechanism of the air-motor. Relatively offset pair of eccentric disks are mounted adjacent each end of the crank shaft and are respectively engaged through the usual straps to actuate the rod connected to the opposite ends of the links 50—50.

Turning to Fig. 6 of the drawings, we have a series of disks 42 which is provided with elongated holes 46'—46'—46', which are staggered. I propose to give the air a longer travel and which, in turn, will keep the air in the thermal heating device to make the air as hot as possible before entering the air motor. 23 is a female connection for the steering column of the steering wheel.

*Method of operation*

Let us assume that the automobile is to be started:

We would start our combustion engine in the front end, which, in turn, is coupled to the air compressor. The air will pass through air line 24 into air tank 26, air tank 26 having an outlet at 29, being the flexible coupling which leads the air to the thermal device; this has an outlet at 32, which leads to the air motor. The air motor is operatively connected to drive the rear axle 38 and the wheels 40 are operatively connected thereto. The combustion engine, air-compressor, flexible coupling and air motor are on the longitudinal center of the air powered car, and operatively connected together; the combustion engine is operatively located on the front end of the car and the air motor is operatively located on the rear end of the car, a thermal device, air tank, flexible coupling, and air tank, being operatively connected and located between the combustion engine and air motor.

The foregoing description and the accompanying drawings are believed to clearly disclose a preferable embodiment of my invention; but it will be understood that this disclosure is merely illustrative and that such changes in the invention may be made as are fairly within the scope and spirit of the following claim:

What is claimed is,

A compressed air-driven vehicle comprising a combustion engine operatively connected to an air compressor, an air pipe connecting said compressor to an air tank and provided with a check valve; said air tank being provided with a flexible coupling fixedly secured to a thermal device, with an exhaust pipe passing therethrough; a second air pipe provided with a check valve operatively disposed and connecting said thermal device and air-motor and drive means for said car coupled with said air motor.

ROBERT B. JOSE.